May 19, 1931. L. O. KELLEY 1,806,167
WEIGHING SCALE
Filed Oct. 10, 1929 2 Sheets-Sheet 1
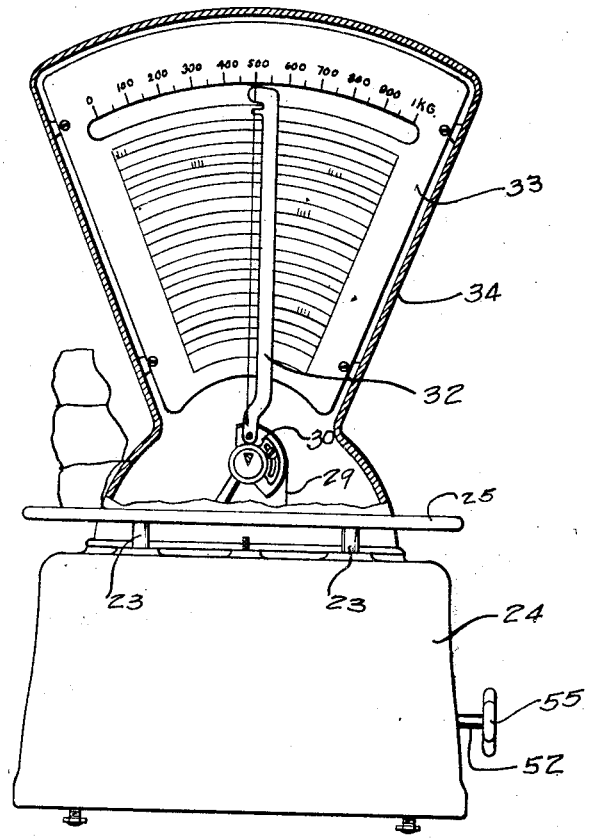
Fig—I
Inventor
Leonard O. Kelley
By COMarshall
Attorney

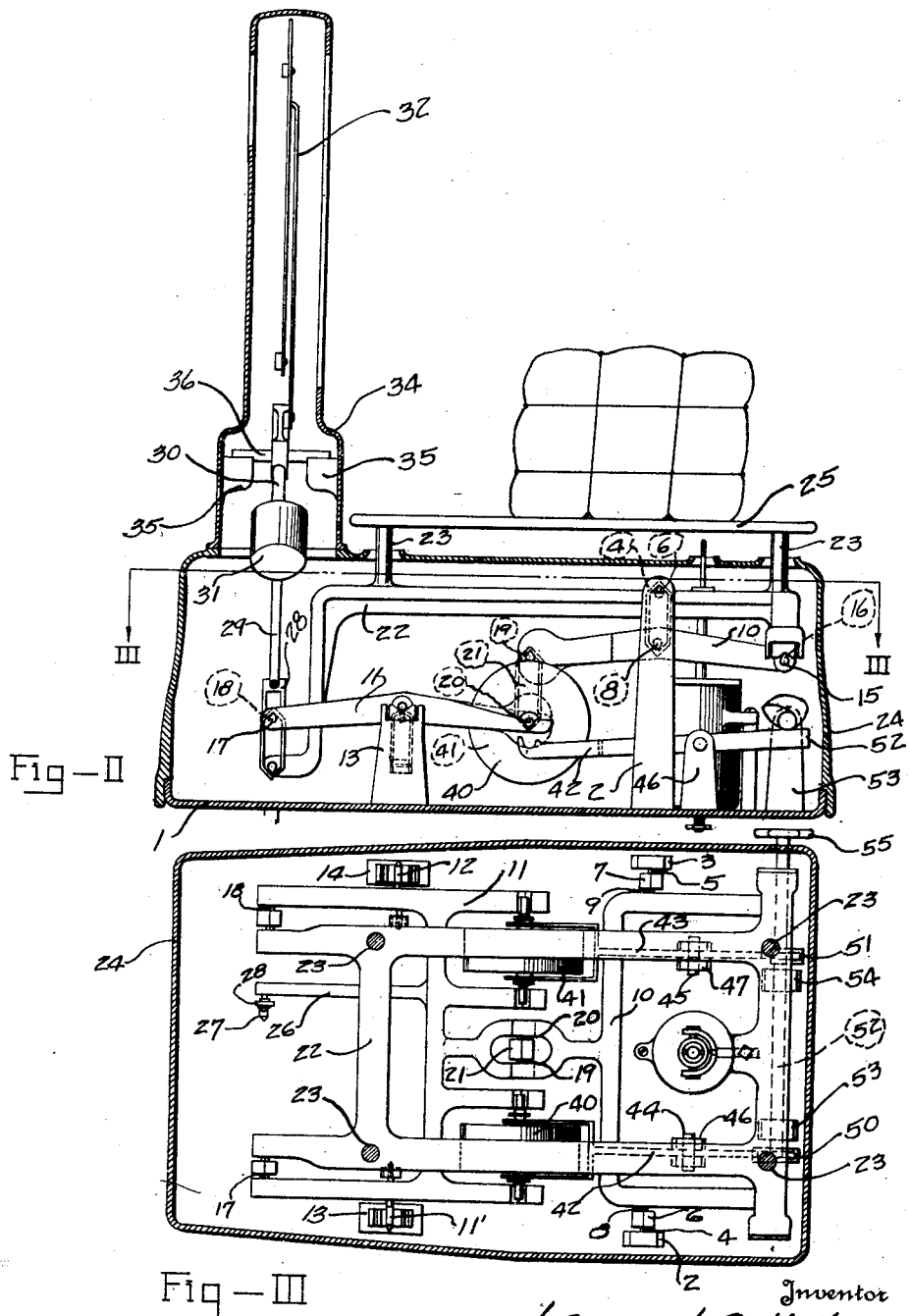

Patented May 19, 1931

1,806,167

UNITED STATES PATENT OFFICE

LEONARD O. KELLEY, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed October 10, 1929. Serial No. 398,755.

This invention relates to weighing scales and in particular to scales in which the weighing capacity of the chart may be increased several times by the addition of unit weights on some part of the lever mechanism, each of which then counterbalances a load in the amount of the chart capacity.

One of the principal objects of this invention is the provision of an improved, simple, reliable and compact scale.

Another object is the provision of capacity increasing means in a scale employing even armed levers.

Another object is the provison of a "four point" platform in conjunction with the above mentioned lever system.

A still further object is the provision of means whereby the unit weights are disposed underneath the weighing platter.

Other objects and advantages will be apparent from the following description wherein reference is had to the accompanying drawings, and wherein similar reference numerals refer to similar parts throughout the several views.

In the drawings:—

Figure I is a front elevation, parts broken away, of a scale embodying my invention.

Figure II is a side elevational view, in which the housing is broken away.

Figure III is a plan view sectioned substantially along the line III—III of Figure II.

Referring to the drawings in detail, the base 1 which is preferably a rigid iron casting is provided with two upwardly extending posts 2 and 3 to which laterally extending pivots 4 and 5 are secured. Suspended from the pivots 4 and 5 by the links 6 and 7 and resting on its fulcrum pivots 8 and 9 is an even armed lever 10.

A similar even armed lever 11 is fulcrumed with its pivots 11' and 12 on suitable bearings situated in two shorter posts 13 and 14, uprising from the base 1. The levers 10 and 11 are both provided, in addition to their fulcrum pivots, with load supporting pivots 15, 16 and 17, 18. Inner arms of the levers 10 and 11 are bifurcated and pivots 19 and 20 are fixed in the bifurcations. A link 21 provided with suitable bearing surfaces engages these pivots, thus connecting the levers.

A weighing platter supporting spider 22, which is preferably a light casting and provided with suitable bearings, engages and is supported by the pivots 15, 16 and 17, 18. Fixed to the four corners of the spider 22 are the studs 23 which extend upwardly through openings in a base cover 24, a platter 25 is secured to the studs 23 and serves to support the loads to be weighed. The inner arms of the levers 10 and 11 are provided with enlargements, the weight of which serves to counterbalance some of the weight on the spider and platter.

The lever 11 also has an additional arm 26, projecting outwardly, this arm is provided with a pivot 27 which engages a stirrup 28. The stirrup 28 is fastened to a flexible metallic ribbon 29, secured to and overlying an excentrically fulcrumed circular sector which forms part of the automatic pendulum load counterbalancing mechanism. Adjustably secured to the excentric sector is a downwardly extending stem 30 on which a pendulum weight 31 is fixed. The weight moment of the pendulum in the zero position serves to counterbalance the remainder of the weight of the spider and platform. Extending upwardly from the pendulum is an indicating hand 32, which co-operates with a stationary indicia bearing chart 33, suitably positioned within a housing 34 which is fastened to the base cover 24, in the rear of, and facing the platter 25. The housing 34 is also provided with two inwardly extending bearing brackets 35 on which the pendulum pivot 36 is resting.

The mechanism so far described is adapted to automatically indicate the weight of loads, up to and including the chart capacity.

It is an advantage to have a large movement of the indicator for small increments of loads, for this reason the scale embodying the invention is equipped with a chart of low capacity, although the size of the chart is not reduced. This, it will be seen, results in a long indicator travel for light loads.

In scales which have a small automatic capacity it is sometimes difficult to obtain a stable pendulum, as due to the lever ratio, the force exerted by the load on the pendulum ribbon or connecting rod is small, and careful workmanship and expensive methods must be employed to assure an accurate weighing scale.

In the scale embodying my invention I employ even armed levers, thus a small force resulting from a light load is transmitted undiminished to the counterbalancing pendulum. The pendulum accordingly is of such weight as to assure a stable and reliable indication in a scale which may be manufactured economically.

It is well known that in retail stores the great majority of sales are below a certain weight. It is the intention, in building the scale of the invention, to make the chart of such capacity to weigh the majority of drafts automatically and provide manipulative capacity increasing means for weighing the occasional drafts of greater weight.

The manipulative capacity increasing means include the unit weights 40 and 41. These unit weights are provided with laterally extending trunnions which are adapted to be deposited in suitable bearings, located at the proper distance from the fulcrum, in the arms of the lever 11, by the operating levers 42 and 43. These operating levers are fulcrumed on the pintles 44 and 45, and are positioned in slots in the posts 46 and 47, which extend upwardly from the base 1.

Loads up to and including the chart capacity are instantly and reliably indicated on the chart by the weight of the article acting through the scale mechanisms. When, however, it is desired to weigh loads beyond the capacity of the automatic chart, a part of the load equal to the chart capacity is counterbalanced by each of the unit weights 40 and 41.

When the scale is used for weighing loads within the automatic chart capacity, the unit weights 40 and 41 are supported in the forks of the operating levers 42 and 43, out of engagement with the inner arms of lever 11.

These operating levers 42 and 43 are held in the raised position by a plurality of cams 50 and 51, which are pinned to a shaft 52 and press downwardly against one end thereof. The shaft 52 is turnably mounted in upright posts 53 and 54, and extends through the base cover 24. A manipulating handle 55 is fixed to the projecting end of the shaft 52.

Assuming that the chart capacity is one kg. and it is desired to weigh a load of two and one-half kg. When this load is placed on the platform, the indicating hand will immediately move beyond the chart capacity, indicating to the operator that the load is too great for the automatic capacity and that the manipulating capacity increasing means must be employed. When the handle 55 is turned, in a clock-wise direction, through an angle of 120°, the cam 50 is also turned through the same angle, allowing the operating lever 42, which it contacts, to deposit the unit weight 40, on the bearings in the arms of the lever 11. The weighing capacity of the scale is thereby increased in the amount of the chart capacity viz: one kg., and the total capacity is now two kg. As the load, however, in the example weighs 2.5 kg. the indicator remains beyond the one kg. indicium on the chart and it is necessary to deposit the second unit weight 41 by a further 120° turn of the handle 55 on its bearings in the arms of the lever 11.

Two kgs. of the load are now counterbalanced by the unit weights and the remainder by the automatic pendulum counterbalancing means. The indicator, accordingly points to the 500 gr. graduations on the chart.

A still further turn of the handle 52 through 120° in a clockwise direction again raises the unit weight off the lever, and loads up to the chart capacity may again be weighed automatically.

It is the intention to provide means to indicate the amount of load offset by the unit weights. As mechanisms for accomplishing this are old, I have not described or shown it.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, indicating, counterbalancing mechanism and load receiving means in operative relation to each other, said load receiving means including a pair of even armed levers, each of said levers having fulcrum, load and connecting pivots, one of said levers having a nose pivot, the edge of which is on a line coincident with the edges of its load pivots.

2. In a weighing scale, in combination, indicating and weighing mechanism in operative relation to each other, said weighing mechanism including a pair of even armed levers supporting a load receiver and a unit weight adapted to be deposited on one of said even armed levers.

3. In a weighing scale, in combination, indicating and weighing mechanism in operative relation to each other, said weighing mechanism including a pair of even armed levers supporting a load receiver and a plurality of unit weights adapted to be deposited on one of said even armed levers.

4. In a weighing scale, in combination, indicating, and weighing means in operative relation to each other, said weighing means including a pair of even armed levers, one of said even armed levers having a nose pivot on one side of its fulcrum and means for receiving a unit weight on the opposite side.

5. In a weighing scale, in combination, indicating, and weighing means in operative relation to each other, said weighing means including a pair of even armed levers, one of said even armed levers having a nose pivot on one side of its fulcrum and means for receiving a plurality of unit weights on the opposite side.

6. In a weighing scale, in combination, weighing and indicating mechanism in operative relation to each other, said weighing mechanism including a plurality of even armed levers, one of said levers having a nose pivot at a pre-determined distance from and on one side of its fulcrum and a bearing for the reception of a unit weight at an equal distance on the opposite side of its fulcrum.

7. In a weighing scale, in combination, weighing and indicating mechanisms in operative relation to each other, said weighing mechanism including a plurality of even armed levers, one of said levers having a nose pivot at a pre-determined distance from and on one side of its fulcrum and bearings for the reception of a plurality of unit weights at an equal distance on the opposite side of its fulcrum.

8. In a weighing scale, a pair of even armed load supporting levers, counterbalancing mechanism for offsetting a part of the load connected thereto, and unit weight mechanism for offsetting the remainder of the load in conjunction therewith, said unit weight offsetting an increment of load equal to its weight.

9. In a weighing scale, a pair of even armed load supporting levers, counterbalancing mechanism for offsetting a part of the load connected thereto, and unit weight mechanism for offsetting the remainder of the load in conjunction therewith, each of said unit weights offsetting an increment of load equal to its weight.

LEONARD O. KELLEY.